(12) United States Patent
Agee

(10) Patent No.: US 9,034,208 B1
(45) Date of Patent: May 19, 2015

(54) PROCESS TO CONVERT NATURAL GAS INTO LIQUID FUELS AND CHEMICALS

(75) Inventor: Kenneth L. Agee, Tulsa, OK (US)

(73) Assignee: EMERGING FUELS TECHNOLOGY, INC., Tulsa, OK (US)

(*) Notice: Subject to any disclaimer, the term of this patent is extended or adjusted under 35 U.S.C. 154(b) by 0 days.

(21) Appl. No.: 13/370,979

(22) Filed: Feb. 10, 2012

Related U.S. Application Data

(60) Provisional application No. 61/441,789, filed on Feb. 11, 2011.

(51) Int. Cl.
*C01B 3/38* (2006.01)
*C01B 3/36* (2006.01)

(52) U.S. Cl.
CPC ........... *C01B 3/36* (2013.01); *C01B 2203/0244* (2013.01)

(58) Field of Classification Search
CPC ........................................................ C01B 3/36
USPC ........................................................ 252/373
See application file for complete search history.

(56) References Cited

U.S. PATENT DOCUMENTS

| | | | |
|---|---|---|---|
| 3,533,221 A | 10/1970 | Tamura | |
| 4,264,340 A | 4/1981 | Sircar et al. | |
| 4,666,680 A * | 5/1987 | Lewis ........................... | 422/628 |
| 4,869,894 A | 9/1989 | Wang et al. | |
| 5,755,840 A | 5/1998 | Beer | |
| 6,048,472 A | 4/2000 | Nataraj et al. | |
| 6,143,056 A | 11/2000 | Smolarek et al. | |
| 6,361,584 B1 | 3/2002 | Stevens et al. | |
| 6,695,983 B2 | 2/2004 | Prasad et al. | |
| 7,399,329 B2 * | 7/2008 | Arcuri ......................... | 48/197 R |
| 7,550,635 B2 | 6/2009 | Tio | |
| 7,642,377 B1 | 1/2010 | Singh | |
| 7,867,320 B2 * | 1/2011 | Baksh et al. ...................... | 95/96 |
| 2002/0006969 A1 * | 1/2002 | O'Beck et al. ................ | 518/704 |
| 2002/0108494 A1 | 8/2002 | Sircar et al. | |
| 2005/0085558 A1 * | 4/2005 | Abazajian .................... | 518/726 |
| 2006/0090395 A1 | 5/2006 | Rode et al. | |
| 2007/0282018 A1 * | 12/2007 | Jenkins et al. ................ | 518/702 |
| 2009/0012188 A1 * | 1/2009 | Rojey et al. ................... | 518/700 |
| 2009/0186952 A1 * | 7/2009 | Steynberg et al. ............ | 518/704 |
| 2009/0261587 A1 | 10/2009 | Lomax et al. | |
| 2010/0137458 A1 * | 6/2010 | Erling .......................... | 518/702 |
| 2010/0256246 A1 | 10/2010 | Carryer et al. | |
| 2010/0298450 A1 | 11/2010 | Datta et al. | |
| 2011/0034569 A1 | 2/2011 | Basu et al. | |

OTHER PUBLICATIONS

Korobitsyn et al., SOFC as a Gas Separator, NOVEM contract No. 219.401-0012, Dec. 2000.

* cited by examiner

*Primary Examiner* — Melvin C Mayes
*Assistant Examiner* — Kenneth Vaden
(74) *Attorney, Agent, or Firm* — Head, Johnson & Kachigian, P.C.

(57) ABSTRACT

A process to convert light hydrocarbons such as natural gas to a liquid or liquids. Vacuum pressure swing adsorption (VPSA) is used to produce a stream of relatively high purity oxygen. The relatively high purity oxygen is reacted with light hydrocarbons and steam in an autothermal reformer in order to produce synthesis gas. The synthesis gas is thereafter converted to a hydrocarbon liquid or liquids via a Fischer Tropsch or related reaction.

10 Claims, 2 Drawing Sheets

Figure 2

| Stream Mol% | 1 | 2 | 3 | 4 | 5 | 6 | 7 |
|---|---|---|---|---|---|---|---|
| $O_2$ | 90 | | | | | | |
| $N_2$/Ar | 10 | | 2.14 | | 2.17 | 4.72 | 12.62 |
| C1 | | 100 | .35 | | .35 | 3.83 | 14.63 |
| C2 | | | | | | .06 | .25 |
| C3 | | | | | | .13 | .52 |
| C4 | | | | | | .20 | .80 |
| $H_2$ | | | 63.76 | 100 | 63.23 | 54.97 | 29.37 |
| CO | | | 28.98 | | 29.41 | 25.57 | 13.67 |
| $CO_2$ | | | 4.77 | | 4.84 | 10.52 | 28.14 |
| MMSCFD | 6.53 | 10.4 | 30.5 | .44 | 30.06 | 13.82 | 5.17 |
| Press (Bar) | 30 | 30 | 25 | 5 | 23 | 21 | 19 |

PROCESS TO CONVERT NATURAL GAS INTO LIQUID FUELS AND CHEMICALS

CROSS-REFERENCE TO RELATED APPLICATIONS

This application claims priority to U.S. Provisional Application No. 61/441,789, filed Feb. 11, 2011, which is herein incorporated by reference.

BACKGROUND OF THE INVENTION

1. Field of Invention

This invention relates to a process to convert natural gas into liquid fuels and chemicals. In particular, the present invention relates to a process utilizing vacuum pressure swing adsorption to produce high purity oxygen to react in an autothermal reformer to produce synthesis gas.

2. Prior Art

The Fischer-Tropsch ("FT") Synthesis has been used to convert synthesis gas (carbon monoxide and hydrogen) into hydrocarbon products. These resulting hydrocarbon products can be useful as a synthetic crude oil or further refined into various fuels, chemicals and chemical intermediate products. The FT feedstock synthesis gas can be produced using a wide range of raw materials including, for example, coal, biomass and natural gas. The method of process design and integration is, essential to any effort to convert a raw material into useful hydrocarbon products by FT chemistry. Conversion of the raw material into synthesis gas is often the critical step as it is capital intensive.

Production of synthesis gas requires the introduction of oxygen and/or heat. The source of oxygen can be atmospheric air, enriched air, substantially pure oxygen (90%+$O_2$), steam, or a combination of these.

When the feedstock is natural gas, historically steam has been used as the source to obtain oxygen. This process is known as steam methane reforming. An example of steam methane reforming may be seen in Tio (U.S. Pat. No. 7,550,635). Methane is partially oxidized in a non-catalyzed reaction followed by steam reforming of methane.

Prasad et al. (U.S. Pat. No. 6,695,983) discloses another example of steam methane reforming.

In recent years however, autothermal reforming has gained acceptance for syngas production. Autothermal reforming uses a small amount of steam and substantially pure oxygen to produce synthesis gas by a combination of combustion and reforming reactions. The exothermic partial oxidation reaction provides the necessary heat for endothermic steam methane reforming reactions that occur over a single catalyst bed.

The commercial development of these processes has been driven to larger scale in order to gain advantage from economy of scale. Since steam methane reforming requires a large number of small catalyst filled tubes in a large fired heater, the autothermal reforming process with a single catalyst bed has become a preferred method for many processes requiring synthesis gas. The autothermal reformer is particularly preferred for use with a FT process because it produces synthesis gas at or near the ideal 2/1 hydrogen to carbon monoxide $H_2$/CO molar ratio.

While the technology development is being driven by economy of scale, there are commercial reasons to consider smaller scale development. Natural gas fields vary significantly in size and location, and a substantial portion of the natural gas discovered is stranded and, therefore, has no ready access to a market. This lack of market access is a result of the difficulty to transport the natural gas to a market. The smaller gas fields are disadvantaged compared to larger fields due to limited pipeline access. If the natural gas could be converted to liquid fuels or chemical intermediates it can easily be transported to a market. There are also many more small fields than large fields. Therefore, there is a need to develop a process that can convert natural gas into fuels and/or chemicals efficiently and economically at a relatively small scale.

Beer (U.S. Pat. No. 5,755,840) suggests using an oxygen-sorbent material to add oxygen to a feed stream where the feed stream can be natural gas. The combined feed stream and oxygen can be passed to a reactor for conversion to syngas. In this process, the feed gas is used to desorb the oxygen off of the sorbent. The feed gas/oxygen mixture is a combustible mixture and therefore the time it can be retained prior to reaction is very short. Also, the ability to preheat the mixture is very limited and the process may well be found to be hazardous to practice.

Accordingly, there remains a need for a safe effective method to produce syngas from natural gas at a relatively small scale.

Other processes to obtain enriched air or substantially pure oxygen have been proposed. Baksh et al. (U.S. Pat. No. 7,867,320) discloses a specific mechanical design using a vacuum pressure swing adsorption process.

There remains a need to adapt vacuum pressure swing adsorption technology to conversion of natural gas into liquid fuels and chemicals.

SUMMARY OF THE INVENTION

The present invention is directed to a process for converting natural gas into liquid fuels and/or liquid chemicals. The process uses an adsorption method to separate oxygen from atmospheric air known as Vacuum Pressure Swing Adsorption (VPSA).

The oxygen rich stream of 80% plus, and preferably 90% plus, oxygen then is compressed to a pressure necessary to make synthesis gas for the process, at preferably between 20-40 Bar.

The oxygen rich stream is reacted with a combination of natural gas and steam in an autothermal reformer to produce synthesis gas.

The synthesis gas is then converted to useful fuels and/or chemicals in one or more synthesis conversion reactors. The synthesis gas can be converted to methanol, higher alcohols or higher hydrocarbons and further refined to marketable products.

BRIEF DESCRIPTION OF THE DRAWINGS

FIG. 2 is a table with examples of components from streams in the process of the present invention shown in FIG. 1.

DETAILED DESCRIPTION OF THE PREFERRED EMBODIMENTS

Figure 1:
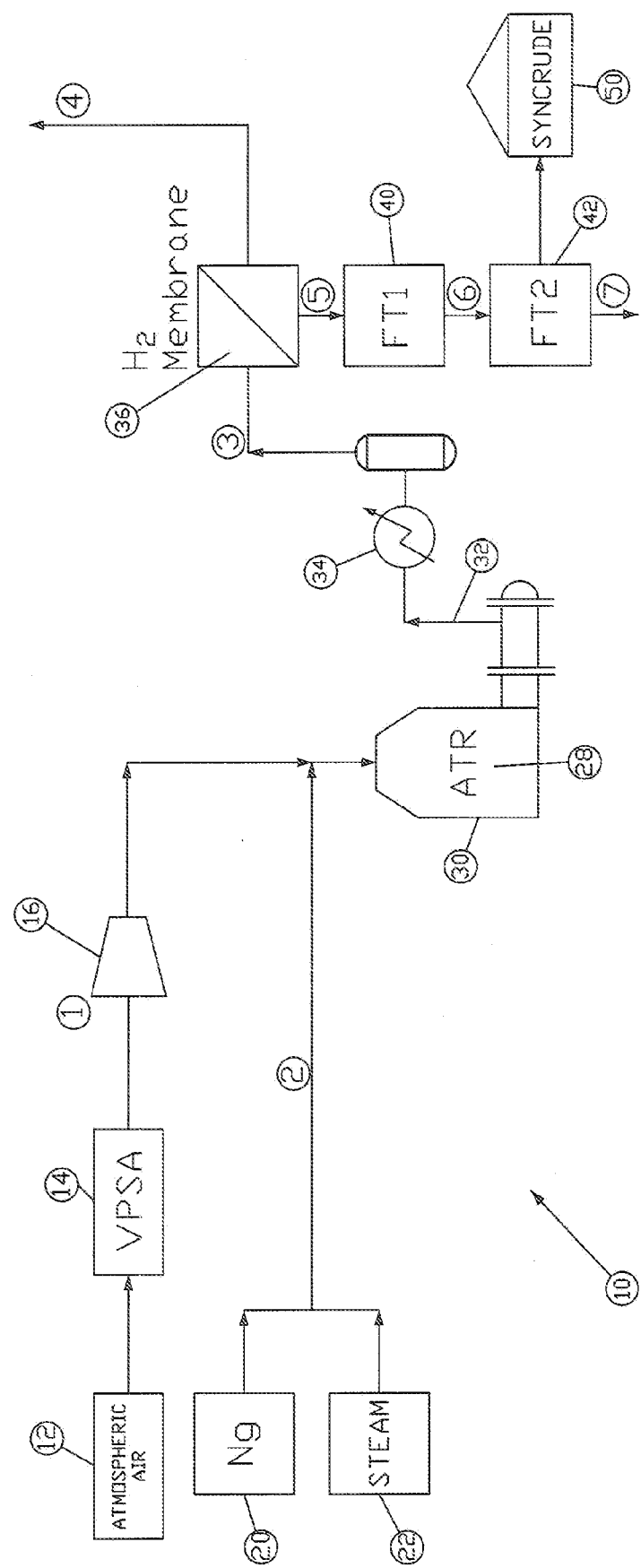
FIG. 1 is a simplified schematic diagram of a process to convert natural gas into liquid fuels and chemicals in accordance with the present invention.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention can be better understood by referring to the non-limiting example shown in a simplified schematic diagram in FIG. 1 with stream example in properties shown in a table in FIG. 2 on a dry basis. FIG. 1 gives an example of a process 10 capable of being used to convert 10.4 MMSCFD of natural gas into 1000 Bbl/d of liquid hydrocarbon product.

The process uses a Vacuum Pressure Swing Adsorption (VPSA) unit to produce a stream (Stream 1) 6.53 MMSCFD of a 90% pure oxygen stream from atmospheric air. As seen in FIG. 1, atmospheric air 12 is delivered to a Vacuum Pressure Swing Adsorption Unit 14. Blowers, compressors or other mechanisms may be utilized to deliver the atmospheric air 12 under pressure to the Vacuum Pressure Swing Adsorption Unit 14.

In one non-limiting embodiment, solid or liquid absorbents are utilized in the VPSA unit which absorb nitrogen more strongly than oxygen. When the pressurized air is introduced to the absorbents, an oxygen-rich gas is left. The oxygen-rich gas is then compressed in a compressor as shown at reference number 16. The oxygen-rich gas may be pressurized from between 20 to 40 Bar. In the example herein, the relatively pure oxygen is collected at low pressure and compressed to approximately 30 Bar.

A stream of natural gas 20 is combined with steam 22 and preheated. The relatively pure oxygen stream 1 is preheated and mixed with Stream 2 comprising 10.4 MMSCFD of natural gas which contains steam in a 0.6 Steam/Carbon molar ratio and is also preheated.

The two streams mix in an autothermal reformer or ATR 30 where they are partially combusted. The partially combusted stream is then reacted over a reforming catalyst adiabatically to produce a syngas stream. The exothermic reaction typically takes place in a chamber 28 where the methane is partially oxidized.

The syngas stream 32 is then cooled in a heat exchanger 34, dried and subjected to a syngas cleanup process to reduce the level of trace components that have an adverse effect on the FT catalyst. This gas as shown in Stream 3, is at approximately 25 Bar and is approximately 30.5 MMSCFD with a H2/CO ratio of approximately 2.2.

The synthesis gas is then subjected to a hydrogen membrane unit 36. A small amount of hydrogen as shown in Stream 4 is removed by a membrane that is hydrogen ($H_2$) permeable. The $H_2$ is alternately cleaned up and optionally purified for use in product upgrading or for export. This stream contains approximately 0.44 MMSCFD of hydrogen. Alternately, more hydrogen could be removed to adjust the $H_2$/CO ratio feed to the FT reactor.

A feed ratio that is less than the stoichiometric requirement (greater than 2.1) will result in an even lower $H_2$/CO ratio at the exit of the FT reactor. The excess hydrogen can be compressed and added to the tail gas or waste gas from the first stage FT reactor to replenish the H2/CO ratio for the second stage FT reactor. Such manipulation of the H2/CO ratio resulting in a ratio in the FT reactors that is below the stoichiometric requirement will result in reduced methane selectivity in the FT reactors and increased yield of heavy hydrocarbon products.

The adjusted synthesis gas as shown in Stream 5 is at approximately 23 Bar and has a volume of 30.06 MMSCFD. This gas is then reacted over a Fischer Tropsch catalyst producing heavy hydrocarbon products as shown by box FT1 at reference numeral 40. A small amount of light hydrocarbons are produced and exit the reactor with unreacted hydrogen and carbon monoxide.

After removal of water, the residue stream from the first reactor is fed to the second FT reactor. This gas as shown in Stream 6 is at approximately 21 Bar and consists of 13.82 MMSCFD of hydrogen, carbon monoxide, carbon dioxide and light hydrocarbons. The reactive components react over the FT catalyst in the second stage FT reactor as shown by box FT2 at reference number 42 where they are converted to additional hydrocarbon products.

The tail gas or waste gas shown in Stream 7 from the second stage FT reactor is significantly reduced in volume from the feed gas with 5.17 MMSCFD. This gas has higher levels of inerts as $CO_2$ and N2/Ar which have built up to about 40% of the stream due to the conversion of $H_2$ and CO into hydrocarbon products. This gas can be used as fuel to preheat feed gases and/or recycled to the ATR. The FT reactor section can also be configured to include a recycle stream around one or both reactors, or configured with a single FT reactor with a recycle stream.

The result of the above process is the production of approximately 1,000 BPD of synthetic liquid crude oil as shown at box 50. This syncrude can optionally be upgraded to fuels, chemicals and/or chemical intermediate products such as diesel, jet fuel, solvents, waxes, lubricants and gasoline.

Whereas, the present invention has been described in relation to the drawings attached hereto, it should be understood that other and further modifications, apart from those shown or suggested herein, may be made within the spirit and scope of this invention.

What is claimed is:

1. A process to convert light hydrocarbons to a liquid or liquids which process comprises:
   using vacuum pressure swing adsorption (VPSA) in a VPSA unit to produce a stream of relatively high purity oxygen from atmospheric air wherein the relatively high purity oxygen is greater than 80% oxygen by volume;
   compressing the relatively high purity oxygen;
   adding steam to light hydrocarbons and then preheating the light hydrocarbons and steam;
   mixing the high purity oxygen and light hydrocarbons with steam after the preheating and partially combusting in an autothermal reformer;
   reacting the compressed relatively high purity oxygen with the light hydrocarbons and steam in the autothermal reformer to produce synthesis gas;
   subjecting the synthesis gas to a hydrogen membrane unit to remove hydrogen from the synthesis gas and produce an adjusted synthesis gas and a hydrogen stream;
   converting the adjusted synthesis gas to a hydrocarbon liquid or liquids via a Fischer Tropsch reaction or to methanol or higher alcohols; and
   using tail gas generated during the adjusted synthesis gas conversion as fuel to preheat the light hydrocarbons and steam, to preheat the high purity oxygen, or to preheat both the light hydrocarbons and steam and the high purity oxygen.

2. The process to convert light hydrocarbons to a liquid or liquids as set forth in claim 1 wherein the light hydrocarbons are natural gas.

3. The process to convert light hydrocarbons to a liquid or liquids as set forth in claim 1 wherein the light hydrocarbons are ethane.

4. The process to convert light hydrocarbons of claim 1 wherein the synthesis gas is converted to a liquid or liquids chosen from the group consisting of methanol, ethanol, a mixture of higher alcohols and a synthetic crude via a Fisher Tropsch reaction.

5. The process to convert light hydrocarbons of claim 1 wherein the synthesis gas is converted to synthetic crude oil via a Fisher Tropsch reaction and the Fischer Tropsch synthetic crude oil is upgraded to produce a mixture of fuels and/or chemicals chosen from the group consisting of; naphtha, gasoline, diesel, jet fuel, kerosene, lubricants, drilling fluids, paraffinic solvents, isoparaffinic solvents, and waxes and a pumpable syncrude.

6. The process to convert light hydrocarbons of claim 1 wherein the step of using Vacuum Pressure Swing Adsorption includes using sorbents to separate nitrogen and oxygen.

7. The process to convert light hydrocarbons of claim 1 further comprising exporting the hydrogen stream.

8. The process to convert light hydrocarbons of claim 1 where the step of converting the adjusted synthesis gas to a hydrocarbon liquid or liquids via a Fischer Tropsch reaction or to methanol or higher alcohols comprises:
    reacting the adjusted synthesis gas over a first Fischer Tropsch catalyst to produce heavy hydrocarbon products and a residue stream of light hydrocarbons, unreacted hydrogen, and carbon monoxide; and
    reacting the residue stream in a second Fischer Tropsch reactor to produce additional hydrocarbon products.

9. The process to convert light hydrocarbons of claim 8, further comprising adding the hydrogen stream to the residue stream prior to reacting the residue stream in the second Fischer Tropsch reactor.

10. The process to convert light hydrocarbons of claim 8, further comprising removing water from the residue stream prior to reacting the residue stream in the second Fischer Tropsch reactor.

\* \* \* \* \*